United States Patent
Ceccarelli et al.

(10) Patent No.: US 9,356,828 B2
(45) Date of Patent: May 31, 2016

(54) SHARED PATH RECOVERY SCHEME (75) Inventors: Daniele Ceccarelli, Genova (IT); Diego Caviglia, Savona (IT); Francesco Fondelli, Calcinaia (IT)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 672 days.

(21) Appl. No.: 13/520,538

(22) PCT Filed: Feb. 17, 2010

(86) PCT No.: PCT/EP2010/051996
§ 371 (c)(1),
(2), (4) Date: Oct. 8, 2012

(87) PCT Pub. No.: WO2011/079967
PCT Pub. Date: Jul. 7, 2011

(65) Prior Publication Data
US 2013/0044589 A1  Feb. 21, 2013

(30) Foreign Application Priority Data
Jan. 4, 2010  (EP) ..................... 10150018

(51) Int. Cl.
*H04L 12/24*  (2006.01)
*H04L 12/735*  (2013.01)
(Continued)

(52) U.S. Cl.
CPC .......... *H04L 41/0654* (2013.01); *H04L 45/128* (2013.01); *H04L 45/22* (2013.01); *H04L 45/28* (2013.01); *H04L 45/50* (2013.01); *H04L 47/125* (2013.01); *H04L 49/557* (2013.01)

(58) Field of Classification Search
CPC ......... H04L 45/50; H04L 45/28; H04L 45/22; H04L 12/5695
See application file for complete search history.

(56) References Cited

U.S. PATENT DOCUMENTS

2004/0114595 A1*  6/2004  Doukai ..................... 370/389
2004/0205239 A1*  10/2004  Doshi et al. .............. 709/241
(Continued)

FOREIGN PATENT DOCUMENTS

| CN | 1556637 A | 12/2004 |
|----|-----------|---------|
| CN | 1866806 A | 11/2006 |
| EP | 2015509 A1 | 1/2009 |

OTHER PUBLICATIONS

Lang, J.P et al., "RSVP-TE Extensions in Support of End-to-End Generalized Multi-Protocol Label Switching (GMPLS) Recovery", Network Working Group, RFC4872, May 31, 2007, pp. 1-47.
(Continued)

*Primary Examiner* — Jung Park
(74) *Attorney, Agent, or Firm* — Nicholson De Vos Webster & Elliott LLP (57) ABSTRACT

A connection-oriented network has a first working path (W1) and a second working path (W2). A node (E) receives signalling to allocate resources for a part of a recovery path (R1) for the first working path (W1). The resources are shared by the recovery path (R1) for the first working path and a recovery path (R2a) for the second working path (W2). The node (E) stores an association between the shared resources and a node (A) on the first working path, identified in the signalling, which should be notified when the shared resources are used by the recovery path (R2a) for the second working path (W2). An RSVP-TE <NOTIFY_REQUEST> object in the signalling carries an address of the node to be notified. The node (E) sends an RSVP-TE Notify message to a node (A) on the first working path (W1) which indicates that the shared resources are in use.

24 Claims, 5 Drawing Sheets (51) Int. Cl.
*H04L 12/707* (2013.01)
*H04L 12/703* (2013.01)
*H04L 12/723* (2013.01)
*H04L 12/803* (2013.01)
*H04L 12/939* (2013.01)

(56) References Cited

U.S. PATENT DOCUMENTS

| | | | |
|---|---|---|---|
| 2007/0230358 A1* | 10/2007 | Narayanan et al. | 370/244 |
| 2008/0117806 A1* | 5/2008 | Xu | 370/217 |
| 2009/0103533 A1* | 4/2009 | Li et al. | 370/389 |
| 2010/0091647 A1* | 4/2010 | Li et al. | 370/225 |
| 2011/0229122 A1* | 9/2011 | Castoldi et al. | 398/2 |

OTHER PUBLICATIONS

Lang, J.P et al., "RSVP-TE Extensions in support of Eng-to-End Generalized Multi-Protocol Label Switching (GMPLS) Recovery draft-ietf-c camp-gmpls-recoverye2e-signaling-04.txt", Network Working Group, IETF Standard-Working-Draft, Oct. 1, 2006, pp. 1-43.

International Search Report, Application No. PCT/EP2010/051996, dated Apr. 1, 2010, 3 pages.

J.P. Lang et al., "RSVP-TE Extensions in support of End-to-End Generalized Multi-Protocol Label Switching (GMPLS) Recovery; draft-ietf-ccamp-gmpls-recovery-e2e-signaling-04.txt," Oct. 2006, 43 pages, Network Working Group, Internet Draft, Updates RFC 3471, The Internet Society.

G. Li et al., "RSVP-TE Extensions for Shared-Mesh Restoration in Transport Networks; draft-li-shared-mesh-restoration-01.txt," Nov. 2001, 18 pages, Internet Draft.

Lang, J., et al., "Generalized Multi-Protocol Label Switching (GMPLS) Recovery Functional Specification", Network Working Group, RFC 4426, Mar. 2006, 23 pages.

Lang, J.P., et al., "RSVP-TE Extensions in Support of End-to-End Generalized Multi-Protocol Label Switching (GMPLS) Recovery", Network Working Group, RFC 4872, May 2007, 47 pages.

D. Awduche, et al., "RSVP-TE: Extensions to RSVP for LSP Tunnels," Dec. 2001, 61 Pages, Network Working Group, Request for Comments: 3209, The Internet Society.

E. Mannie, et al., "Recovery (Protection and Restoration) Terminology for Generalized Multi-Protocol Label Switching (GMPLS)," Mar. 2006, 22 Pages, Network Working Group, Request for Comments: 4427, The Internet Society.

\* cited by examiner

SHARED PATH RECOVERY SCHEME

CROSS-REFERENCE TO RELATED APPLICATIONS

This application is a National stage of International Application No. PCT/EP2010/051996, filed Feb. 17, 2010, which claims the benefit of EP Application No. 10150018.9, filed Jan. 4, 2010, which are hereby incorporated by reference.

TECHNICAL FIELD

This invention relates to recovery in a connection-oriented network, such as a Generalised Multi-Protocol Label Switching (GMPLS), Multi-Protocol Label Switching (MPLS) or Multi-Protocol Label Switching Transport Profile (MPLS-TP) network.

BACKGROUND

Generalized Multi-Protocol Label Switching (GMPLS) is under development by the Internet Engineering Task Force (IETF) to provide a generalized control plane which can be used to control networks having a range of different network technologies, including packet-based networks and photonic networks.

One aspect of GMPLS is recovery of traffic. The term "recovery" includes protection of traffic and restoration of traffic. Recovery schemes are described in RFC 4426 (Generalized Multi-Protocol Label Switching Recovery Functional Specification). A shared meshed is one of the schemes most commonly deployed by network operators in which protection paths for multiple Label Switched Paths (LSPs) share common link and node resources. Under these schemes, the protection capacity is pre-reserved, i.e. link capacity is allocated to protect one or more LSPs, but explicit action is required to instantiate a specific protection LSP. This requires restoration signaling along the protection path.

Figure 1:
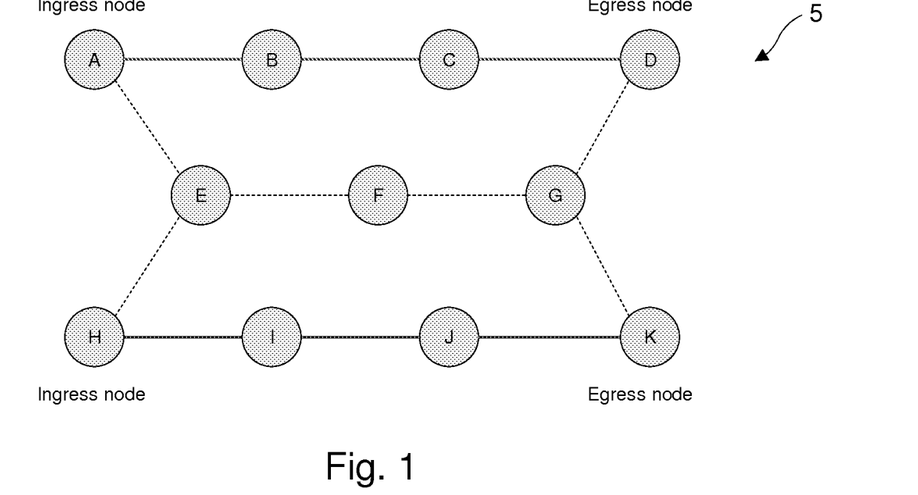
FIG. 1 shows an example of a shared recovery path.

RFC 4872 describes RSVP-TE Extensions in Support of End-to-End Generalized Multi-Protocol Label Switching Recovery. FIG. 1 shows an example network topology to explain how the recovery scheme works. There is a first working LSP [A-B-C-D] and a second working LSP [H-I-J-K]. A recovery path for the first working LSP is [A-E-F-G-D] and a recovery path for the second working LSP is [H-E-F-G-K]. The path [E-F-G] is shared by the two recovery paths. When a failure is detected on one of the working LSPs (e.g. on link B-C), the error is propagated to the ingress node (A). Ingress node (A) activates the protection LSP [A-E-F-G-D] for that working path. This means that the protection path [H-E-F-G-K] is not available. RFC 4872 describes that a node on the working path should notify the head node on the other working path that the resources for the protecting LSP are no longer available, but does not describe how this can be achieved.

A link-state routing protocol such as Open Shortest Path First (OSPF-TE) can propagate information about the resources of the shared path, following transfer of traffic to the protection path. However, the time period between the shared resources being used by one working path and the other working path finding out that the shared recovery path is no longer available can result in a heavy loss of traffic for the second working path. For example, in the case of a photonic network, a single LSP can carry traffic at up to 40 Gbs.

The present invention seeks to provide an alternative way to operate a network in which there is a shared recovery path.

SUMMARY

An aspect of the present invention provides a method of operating a first node in a connection-oriented network in which there is a first working path and a second working path. The method comprises receiving signalling at the first node and causing, in response to the received signalling, the first node to allocate resources for a part of a recovery path for the first working path. The resources are shared by the recovery path for the first working path and a recovery path for the second working path. The method further comprises storing an association between the shared resources and a node on the first working path, identified in the signalling, which should be notified when the shared resources are used by the recovery path for the second working path.

The method allows the first node to notify a node on the working path that will be unprotected when the shared resources are used. By notifying nodes when shared recovery path resources are used, the method minimizes, or prevents, attempts to activate resources already activated by another path. This form of notification allows a very quick signalling when the shared resources are used, and is significantly faster than a link-state routing protocol.

Advantageously, the signalling is control-plane signalling and comprises an RSVP-TE <NOTIFY_REQUEST> object which carries an address of the node to be notified. The signalling can comprise an RSVP-TE Path message which includes the RSVP-TE <NOTIFY_REQUEST> object.

Advantageously, the method further comprises notifying the node on the first working path when the shared resources are required by the recovery path for the second working path.

An aspect of the present invention provides a method of operating a first node in a connection-oriented network having a recovery path for a first working path and a recovery path for a second working path. At least a part of the recovery paths uses shared resources at the first node. The method comprises determining when the shared resources are required by the recovery path for the second working path. The method further comprises notifying a node on the first working path by sending an RSVP-TE Notify message which indicates that the shared resources are in use.

The RSVP-TE Notify message provides an advantageous way of notifying the node on the other working path(s) when the shared recovery path is no longer available. Use of the existing RSVP-TE Notify message allows a very quick signalling when the shared resources are used, and is significantly faster than a link-state routing protocol. Use of the RSVP-TE Notify message avoids the need to create a new message type for this signalling, or the need for nodes to support a further protocol for this signalling. Accordingly, nodes in the network can support the function with minimal changes.

The method can be applied to a situation where two or more recovery paths share resources. In the case of more than two recovery paths sharing resources, the node notifies a node on each of the multiple working paths that will not be able to use a recovery path via that node.

The method can be applied to any connection-oriented network with a GMPLS or MPLS Control plane. Data plane connections can be packet based or can use any of a range of other data plane technologies such as: wavelength division multiplexed traffic (lambda); or time-division multiplexed (TDM) traffic. The data plane can be an MPLS or an MPLS-TP data plane. The "resources" are bandwidth between nodes, and can relate to a part of the total available bandwidth between two nodes (e.g. in a packet-based system), a lambda (wavelength channel) or part of the capacity of a lambda in an optical transport system, a time slot in a TDM transport system or any other resources.

The term "recovery" includes protection and restoration. RFC 4427 (Recovery—Protection and Restoration—Terminology for Generalized Multi-Protocol Label Switching) gives definitions of these terms.

Further aspects of the invention provide apparatus for performing any of the described or claimed steps of the methods. In particular, an aspect of the invention provides apparatus for use at a first node of a connection-oriented network in which there is a first working path and a second working path. The apparatus comprises a receiver for receiving signalling. The apparatus further comprises a processing apparatus which is arranged, in response to the received signalling, to cause the first node to allocate resources for a part of a recovery path for the first working path, the resources being shared by the recovery path for the first working path and a recovery path for the second working path. The processing apparatus is further arranged to store an association between the shared resources and a node on the first working path, identified in the signalling, which should be notified when the shared resources are used by the recovery path for the second working path.

Another aspect of the invention provides apparatus for use at a first node of a connection-oriented network having a recovery path for a first working path and a recovery path for a second working path, wherein at least a part of the recovery paths uses shared resources at the first node. The apparatus comprises a processing apparatus which is arranged to determine when the shared resources are required by the recovery path for the second working path. The processing apparatus is further arranged to notify a node on the first working path by sending an RSVP-TE Notify message which indicates that the shared resources are in use.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described or claimed methods. The machine-readable instructions may be stored on an electronic memory device, hard disk, optical disk or other machine-readable storage medium. The machine-readable instructions can be downloaded to the storage medium via a network connection.

BRIEF DESCRIPTION OF THE DRAWINGS

Embodiments of the invention will be described, by way of example only, with reference to the accompanying drawings in which.

DETAILED DESCRIPTION

Figure 2:
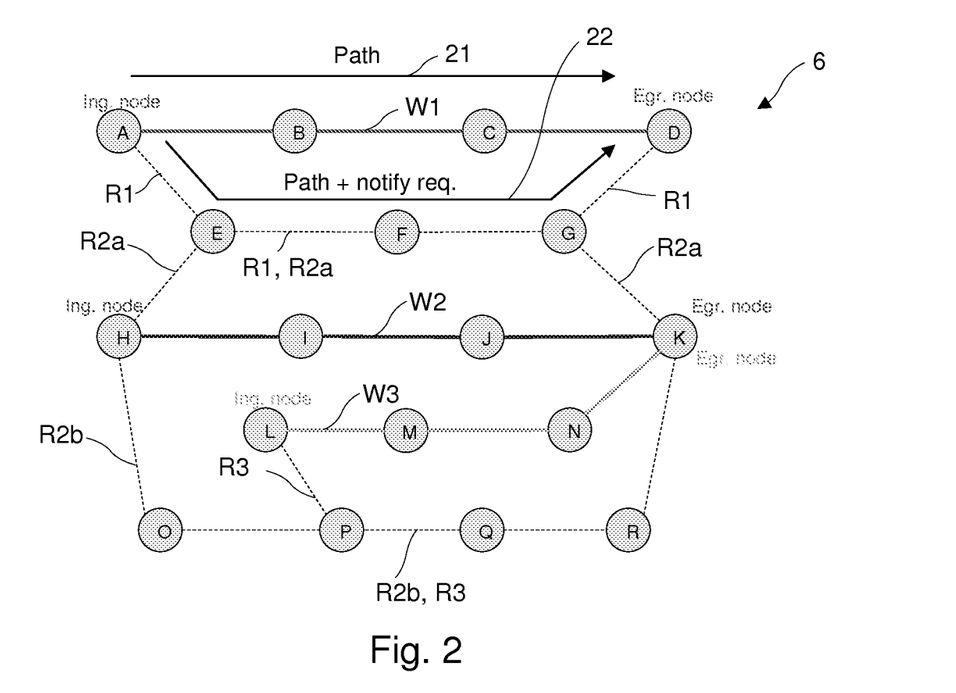
FIG. 2 shows another example of shared recovery paths.

FIG. 2 shows an example of shared meshed restoration in a connection-oriented network 6. There are three working LSPs: a first working path W1 along the path A-B-C-D; a second working path W2 along the path H-I-J-K and a third working path along the path L-M-N-K. Each of the working LSPs can be recovered by one or more restoration LSPs (shown in dashed lines). Multiple restoration LSPs can share some resources. W1 has a recovery LSP R1 with the path A-E-F-G-D. W2 has two recovery LSPs: R2a is the primary recovery LSP with path H-E-F-G-K and R2b is the secondary recovery LSP for W2 with path H-O-P-Q-R-K. W3 has a recovery LSP R3 with path L-P-Q-R-K. It can be seen that the recovery paths R1 and R2a share resources along the path E-F-G and the recovery paths R2b and R3 share resources along the path P-Q-R-K.

FIG. 2 shows signalling when setting up the paths W1, R1. An RSVP-TE Path message 21 is sent along path W1 to reserve resources for the path. An RSVP-TE Path message with a Notify Request 22 is sent along R1. The path message is used to reserve the resources along R1 and the Notify Request allows A to tell nodes E, F and G: "please tell me if someone uses these resources". Similar signalling is used to set up the other working and recovery paths shown in FIG. 2. A node where shared resources are used by recovery paths, such as node E, stores an address of each node that needs to be notified when the shared resources are used.

Figure 3:
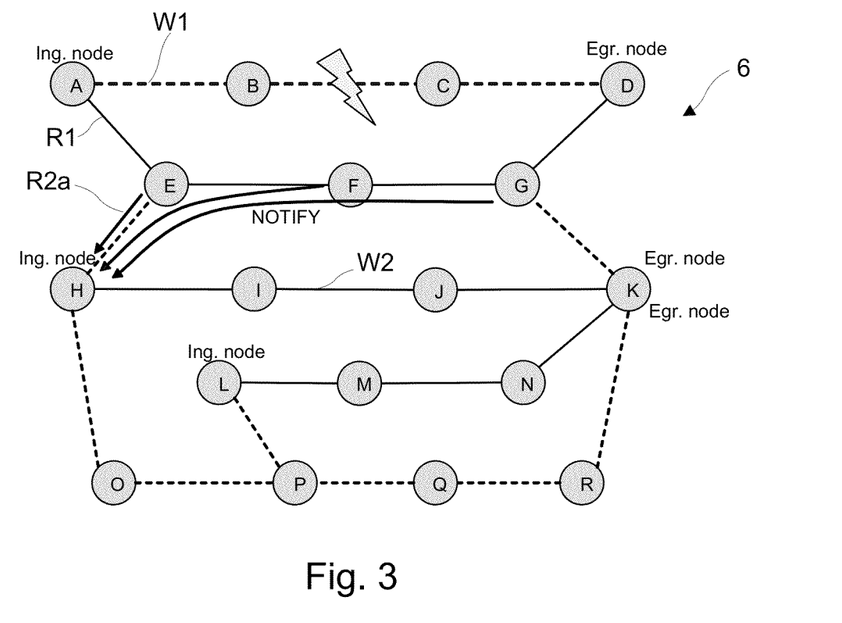
FIGS. 3 and 4 show nodes on the shared recovery path notifying ingress nodes in accordance with an embodiment of the invention.

FIG. 3 shows a situation in which a failure affects W1. R1, the recovery path for W1, is activated. Activation of R1 makes the resources along E-F-G unavailable for R2a. The ingress node (H) of W2 is informed when the resources along the recovery path R2a are not available so that, in case of failure along W2, it can switch the data traffic on recovery path R2b and not along R2a, avoiding significant traffic hits. Each node along the shared resources of R1 (i.e. nodes E, F, G) sends an RSVP-TE Notify message towards the ingress node of LSP W2 (H) to inform it that the resources along R2a are being used by another working LSP and are not available to recover W2. The format of an RSVP-TE Notify Message is defined in RFC 3473. Once node H has received the Notify message from at least one of the nodes along R1, it considers recovery path R2a as not available and designates recovery path R2b as the primary recovery LSP for W2.

Figure 4:
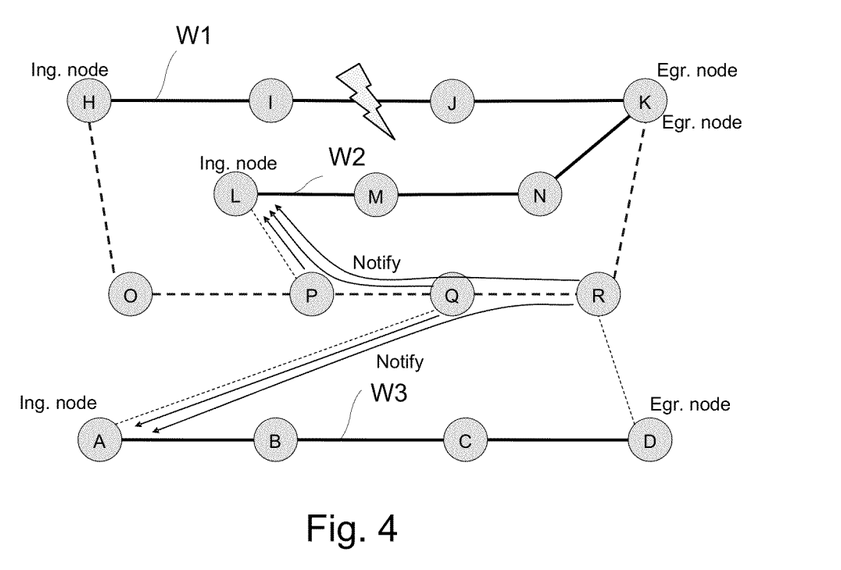

FIG. 4 shows a further example in which the recovery resources along the path P-Q-R are shared among three different working LSPs W1, W2, W3. When W1 fails, the recovery path H-O-P-Q-R-K is activated and nodes P, Q and R inform ingress nodes L (W2) and A (W3) that recovery resources are no longer available.

Figure 5:
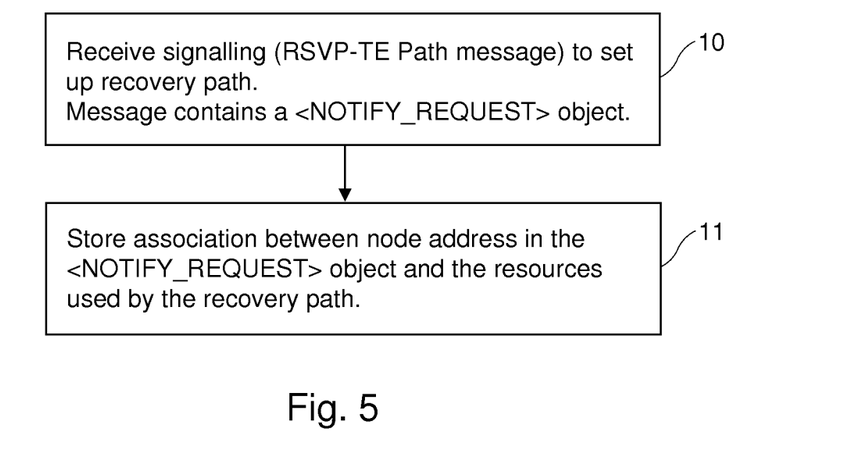
FIG. 5 shows a method performed by a network node when a recovery path is established.

Embodiments of the invention do not modify the general RSVP-TE way of working, ensuring backwards compatibility. FIG. 5 shows a method performed by a node in the network when a recovery LSP is established. The ingress node sends signalling along the intended path of the working path LSP. The ingress node also sends signalling along the intended recovery path LSP to reserve resources. For the recovery path LSP, the signalling is an RSVP-TE Path message which carries a <NOTIFY_REQUEST> object.

At step 10 the node receives the signalling to set up the recovery LSP. The <NOTIFY_REQUEST> object carries an address of a node that should be notified when the resources that are being established are used. The address carried in the <NOTIFY_REQUEST> object is the address of the ingress node of the working LSP that will be affected when the resources of the recovery LSP are used. Referring to FIG. 2, the signalling to establish recovery path R1 includes a <NOTIFY_REQUEST> object that identifies node A, i.e. the ingress node of the working path LSP W1. The signalling received at step 10 can also specify that the resources for the recovery path should be shared with another recovery path. At step the node stores an association between the address carried in the <NOTIFY_REQUEST> object and the resource reserved at the node for that path. The resource can be a lambda, timeslot or any other type of resource of a network. The method shown in FIG. 5 is repeated at each node along the recovery path.

The <NOTIFY_REQUEST> object referred to in FIG. 5 can have the following format:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|           Length             | Class-Num (1) | C-Type (1)    |
+-+-+-+-+-+-+-+-+-+-+-+-+-+-+-+-+-+-+-+-+-+-+-+-+-+-+-+-+-+-+-+-+
|                    IPv4 Notify Node Address                   |
+-+-+-+-+-+-+-+-+-+-+-+-+-+-+-+-+-+-+-+-+-+-+-+-+-+-+-+-+-+-+-+-+
``` where the IPv4 Notify Node Address is a 32 bit address that should be notified when an error message is generated.

Figure 6:
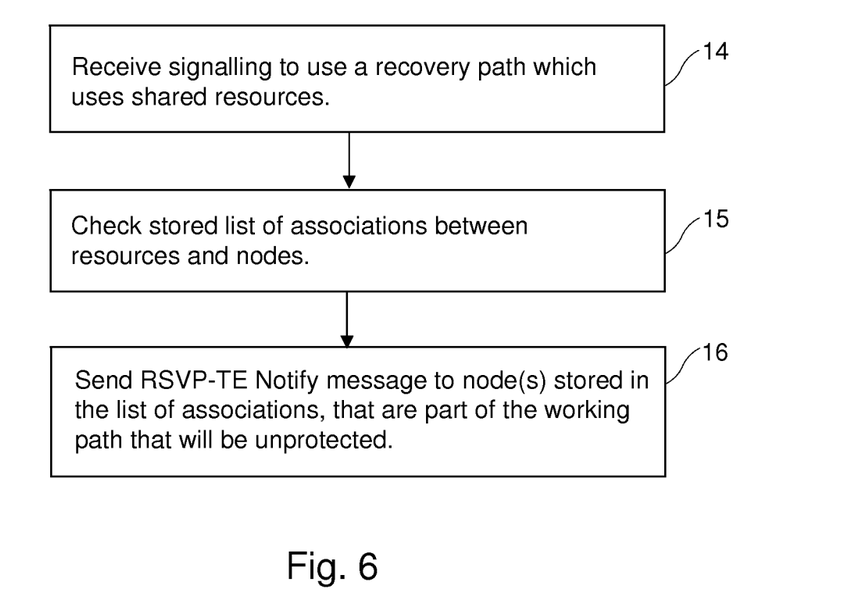
FIG. 6 shows a method performed by a network node when a recovery path is used.

FIG. 6 shows a method performed by a node in the network when a recovery LSP is used. The method shown in FIG. 5 has already been used to establish a recovery path via the node. At step 14 the node receives signalling to use a recovery path with shared resources. At step 15 the node checks the stored list of associations between resources and nodes which need to be notified. Step 16 sends an RSVP-TE Notify message from the node to the ingress node (or nodes) of all the other working LSPs that will be affected by the use of those shared resources. The RSVP-TE Notify message carries a specific Error Code and Error Value to indicate the error condition. Ingress nodes that receive this Notify message note that the recovery LSP is no longer usable. The method shown in FIG. 6 is repeated at each node along the recovery path where resources are shared. An RSVP-TE Notify message has the following format:

```
<Notify message>          ::= <Common Header>
                              [<INTEGRITY>]
                              <MESSAGE_ID>
                              <ERROR_SPEC> <notify session
                               list>
<notify session list>     ::= [ <notify session list> ]
                              <upstream notify session> |
                              <downstream notify session>
<upstream notify session> ::= <SESSION>
                              [ <ADMIN_STATUS> ]
                              [<POLICY_DATA>...]
                              <sender descriptor>
<downstream notify session> ::= <SESSION> [<POLICY_DATA>...]
                              <flow descriptor list>
```

The ERROR_SPEC object comprises an Error Code field and an Error Value field, as described in RFC 2205 Section A.5:

For this specific application of the Notify message the Message ID is mandatory. The Error code is: Error Code=25: "Notify Error" (see RFC 3209) and the Error Value is "Notify Alert Recovery LSP Activated".

Figure 7:
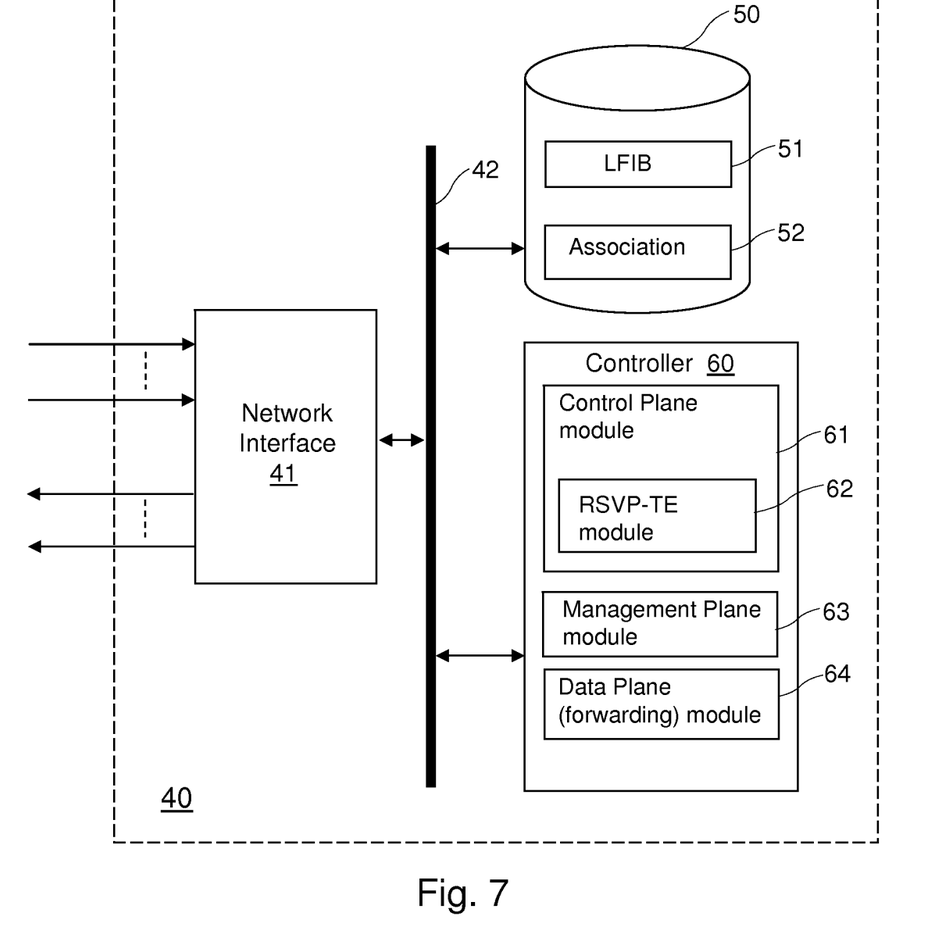
FIG. 7 shows apparatus at a node in accordance with an embodiment of the invention.

FIG. 7 schematically shows a LSR 40 at a network node. The LSR 40 has a network interface 41 for receiving transport units (e.g. packets or frames of data) from other LSRs. Network interface 41 can also receive control plane signalling messages and management plane messages. A system bus 42 connects the network interface 41 to storage 50 and a controller 60. Storage 50 provides a temporary storage function for received packets before they are forwarded. Storage 50 also stores control data 51 which controls the forwarding behaviour of the LSR 40. In IETF terminology, the forwarding data 51 is called a Label Forwarding Information Base (LFIB). Storage 50 also stores an association 52 between resources reserved for a recovery path and an address carried in a <NOTIFY_REQUEST> object.

Controller 60 comprises a set of functional modules 61-64 which control operation of the LSR. A Control Plane module 61 exchanges signalling and routing messages with other network nodes and can incorporate functions for IP routing and Label Distribution Protocol. The Control Plane module 61 can support RSVP-TE signalling, allowing the LSR 40 to signal to other nodes to implement the traffic recovery operation by signalling the occurrence of a failure and activating a required backup LSP. An RSVP-TE module 62 supports RSVP-TE signalling, which is used to set-up LSPs. RSVP-TE module 62 also stores an association 52 in storage 50 between resources reserved for a recovery path and an address of a node on each working path that needs to be notified when the resources are used, as received in an RSVP-TE <NOTIFY_REQUEST> object. As described in FIG. 6, module 62 determines when shared resources are used, checks the list of associations 52, and sends an RSVP-TE Notify message to each node in the list that will be left without a recovery path when the shared resources are used. A Management Plane module 63 (if present) performs signalling with a Network Management System, allowing LSPs to be set up. A Data Plane forwarding module 64 performs label look up and switching to support forwarding of received transport units (packets). The Data Plane forwarding module 64 uses the forwarding data stored in the LFIB 51. The set of modules can be implemented as blocks of machine-executable code, which are executed by a general purpose processor or by one or more dedicated processors or processing apparatus. The modules can be implemented as hardware, or a combination of hardware and software. Although the functionality of the apparatus are shown as set of separate modules, it will be appreciated that a smaller, or larger, set of modules can perform the functionality.

Although a single storage entity 50 is shown in FIG. 7, it will be appreciated that multiple storage entities can be provided for storing different types of data. Similarly, although a single controller 60 is shown, it will be appreciated that multiple controllers can be provided for performing the various control functions. For example, forwarding of transport units can be performed by a dedicated high-performance processor while other functions can be performed by a separate processor.

Figure 8:
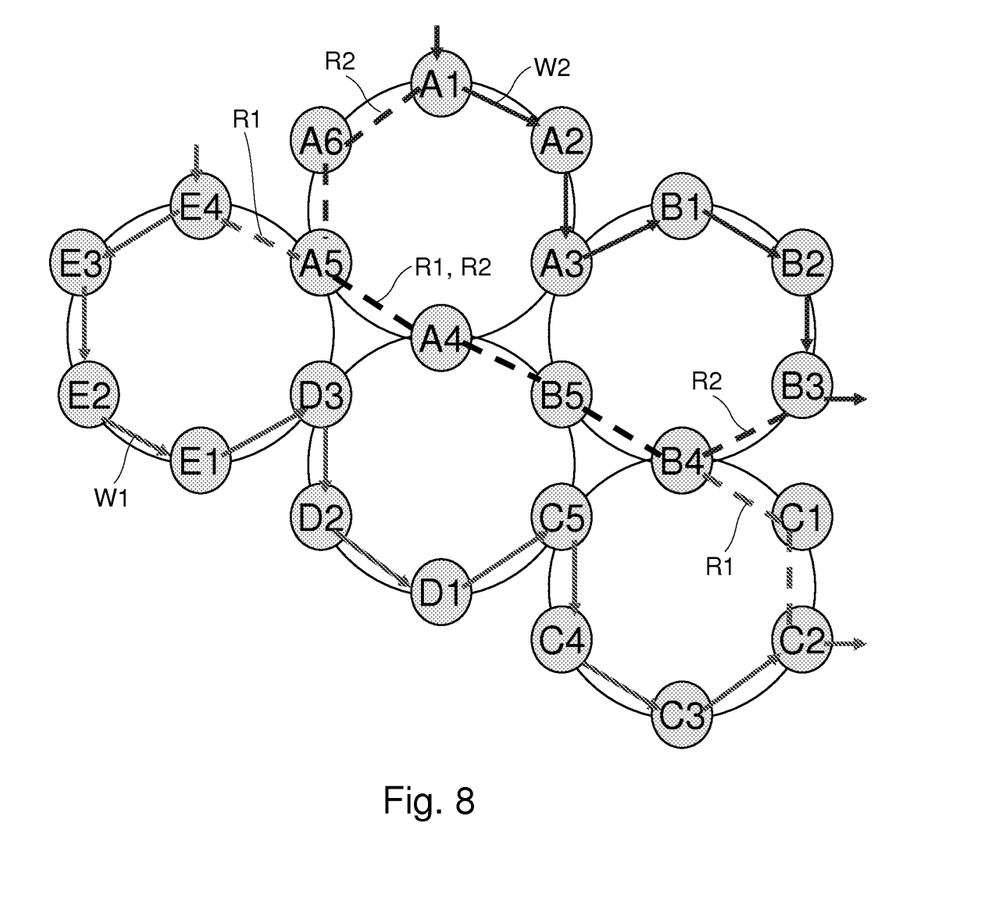
FIG. 8 shows another example of a shared recovery path.

FIG. 8 shows an example of a shared recovery path in a network topology comprising interconnected rings. Two working LSPs are shown: a first working path W1 along the path E4-E3-E2-E1-D3-D2-D1-C5-C4-C3-C2 and a second working path W2 along the path A1-A2-A3-B1-B2-B3. A recovery path R1 for W1 has the path E4-A5-A4-B5-B4-C1-C2. A recovery path R2 for W2 has the path A1-A6-A5-A4-B5-B4-B3. Recovery paths share resources between nodes A5 and B4. Nodes along the shared path between nodes A5 and B4 notify the ingress node A1 of working path W2, when the shared resources are used by R1. Similarly, nodes along the shared path between nodes A5 and B4 notify the ingress node E4 of working path W1, when the shared resources are used by R2.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of operating a first node in a connection-oriented network in which there is a first working path and a second working path, the method comprising:
    receiving signalling at the first node, wherein the first node is shared between a first recovery path for the first working path and a second recovery path for the second working path, wherein the signalling is received from one node of the first working path;
    causing, in response to the signalling received from the one node of the first working path, the first node to allocate resources for a part of the first recovery path for the first working path, the resources being at the first node and being shared by the first recovery path for the first working path and the second recovery path for the second working path; and
    storing an association between the shared resources and a second node on the first working path, wherein the second node is identified in the signalling, and wherein the first node is to notify the second node when the shared resources are used by the second recovery path for the second working path.

2. The method according to claim 1 wherein the signalling comprises an RSVP-TE <NOTIFY_REQUEST> object which carries an address of the second node to be notified.

3. The method according to claim 1 wherein the signalling comprises an RSVP-TE Path message that includes the RSVP-TE <NOTIFY_REQUEST> object.

4. The method according to claim 1 further comprising notifying the second node on the first working path when the shared resources are required by the second recovery path for the second working path.

5. The method according to claim 4 wherein the step of notifying the second node on the first working path notifies an ingress node of the first working path.

6. The method according to claim 4 wherein the step of notifying the second node on the first working path sends an RSVP-TE Notify message to the second node on the first working path.

7. The method according to claim 6 wherein the RSVP-TE Notify message comprises at least one of: an Error Code=25; an Error Value="Notify Alert Recovery LSP Activated".

8. A method of operating a first node in a connection-oriented network having a first recovery path for a first working path and a second recovery path for a second working path, wherein at least a part of the first and second recovery paths uses shared resources at the first node, the method comprising:
    determining when the shared resources in the first node are required by the second recovery path for the second working path, wherein the first node is shared between the first recovery path for the first working path and the second recovery path for the second working path;
    checking a stored list of associations between the shared resources in the first node and nodes that need to be notified; and
    notifying a second node on the first working path based on the stored list of association by sending an RSVP-TE Notify message which indicates that the shared resources are in use.

9. The method according to claim 8 wherein the step of notifying the second node on the first working path sends the RSVP-TE Notify message to an ingress node of the first working path.

10. The method according to claim 8 wherein the RSVP-TE Notify message comprises at least one of: an Error Code=25; an Error Value="Notify Alert Recovery LSP Activated".

11. An apparatus for use at a first node of a connection-oriented network in which there is a first working path and a second working path, the apparatus comprising:
    a receiver for receiving signalling, wherein the signalling is received from one node of the first working path;
    a processing apparatus that is arranged, in response to the signalling received from the one node of the first working path, to:
        cause the first node to allocate resources for a part of a first recovery path for the first working path, the resources being shared by the first recovery path for the first working path and a second recovery path for the second working path, wherein the first node is a node shared between the first recovery path for the first working path and the second recovery path for the second working path; and
        store an association between the shared resources and a second node on the first working path, wherein the second node is identified in the signalling, and wherein the second node is to be notified when the shared resources are used by the second recovery path for the second working path.

12. The apparatus according to claim 11 wherein the signalling comprises an RSVP-TE <NOTIFY_REQUEST> object which carries an address of the second node to be notified.

13. An apparatus for use at a first node of a connection-oriented network having a first recovery path for a first working path and a second recovery path for a second working path, wherein at least a part of the first and second recovery paths uses shared resources at the first node, the apparatus comprising:
    a processing apparatus that is arranged to:
        determine when the shared resources are required by the second recovery path for the second working path, wherein the first node is a node shared between the first recovery path for the first working path and the second recovery path for the second working path;

check a stored list of associations between the shared resources in the first node and nodes that need to be notified; and notify a second node on the first working path by sending an RSVP-TE Notify message which indicates that the shared resources are in use; and a storage coupled to the processing apparatus, wherein the storage is configured to store the list of associations.

14. The apparatus according to claim 13 wherein the processing apparatus is arranged to send the RSVP-TE Notify message to an ingress node of the first working path.

15. A non-transitory machine-readable storage medium having machine-readable instructions for causing a processor to perform a method, the method comprising:

receiving signalling at the first node, wherein the first node is a node shared between a first recovery path for the first working path and a second recovery path for the second working path, wherein the signalling is received from one node of the first working path;

causing, in response to the signalling received from the one node of the first working path, the first node to allocate resources for a part of the first recovery path for the first working path, the resources being shared by the first recovery path for the first working path and the second recovery path for the second working path; and storing an association between the shared resources and a second node on the first working path, wherein the node is identified in the signalling, and wherein the first node is to notify the second node when the shared resources are used by the second recovery path for the second working path.

16. The non-transitory machine-readable storage medium of claim 15 wherein the signalling comprises an RSVP-TE <NOTIFY_REQUEST> object that carries an address of the second node to be notified.

17. The non-transitory machine-readable storage medium of claim 15 wherein the signalling comprises an RSVP-TE Path message that includes the RSVP-TE <NOTIFY_REQUEST> object.

18. The non-transitory machine-readable storage medium of claim 15 wherein the method further comprises notifying the second node on the first working path when the shared resources are required by the second recovery path for the second working path.

19. The non-transitory machine-readable storage medium of claim 18 wherein the step of notifying the second node on the first working path notifies an ingress node of the first working path.

20. The non-transitory machine-readable storage medium of claim 18 wherein the step of notifying the second node on the first working path sends an RSVP-TE Notify message to the second node on the first working path.

21. The non-transitory machine-readable storage medium of claim 20 wherein the RSVP-TE Notify message comprises at least one of: an Error Code=25; an Error Value="Notify Alert Recovery LSP Activated".

22. A non-transitory machine-readable storage medium having machine-readable instructions stored therein, which when executed by a processor, cause a processor to perform a method of operating a first node in a connection-oriented network having a first recovery path for a first working path and a second recovery path for a second working path, wherein at least a part of the first and second recovery paths uses shared resources at the first node, the method comprising:

determining when the shared resources in the first node are required by the second recovery path for the second working path, wherein the first node is a node shared between the first recovery path for the first working path and the second recovery path for the second working path;

checking a stored list of associations between the shared resources in the first node and nodes that need to be notified; and notifying a second node on the first working path based on the stored list of association by sending an RSVP-TE Notify message which indicates that the shared resources are in use.

23. The non-transitory machine-readable storage medium of claim 22 wherein the step of notifying the second node on the first working path sends the RSVP-TE Notify message to an ingress node of the first working path.

24. The non-transitory machine-readable storage medium of claim 22 wherein the RSVP-TE Notify message comprises at least one of: an Error Code=25; an Error Value="Notify Alert Recovery LSP Activated".

* * * * *